United States Patent Office 3,280,094
Patented Oct. 18, 1966

3,280,094
POLYMERIZATION OF DIOLEFINS
Lawrence E. Forman, Akron, Ohio, assignor to The Firestone Tire & Rubber Company, Akron, Ohio, a corporation of Ohio
No Drawing. Filed Aug. 14, 1961, Ser. No. 131,070
1 Claim. (Cl. 260—94.2)

This invention relates to the polymerization of conjugated diolefins and mixtures thereof with unsaturated compounds copolymerizable therewith to yield products in which the portions of the polymeric chains derived from the diolefins closely approximate the microstructure of Hevea rubber. Particularly when the diolefins are used in major proportions, and still more particularly when the diolefin employed is isoprene, the products closely approach, in technical properties and fundamental chemical and physical properties, natural Hevea rubber.

For many important uses, natural Hevea rubber is still the most satisfactory material, notwithstanding the extensive development of synthetic diene rubbers in recent years. Hevea rubber lends itself readily to fabrication processes, having excellent tack and other manipulative properties which facilitate manufacturing operations carried out thereon. Hevea rubber yields vulcanizates which are greatly superior to the other diene rubber vulcanizates in point of tensile strength (particularly when the comparison is made with non-reinforced stocks), elongation at break, and low running temperatures. These last properties have rendered Hevea rubber indispensable in large heavy duty tires such as truck and bus tires.

These superiorities of Hevea rubber over the synthetic diene polymers heretofore produced appear fundamentally to be due to the extreme regularity of the mode of polymerization of isoprenoid residues in Hevea rubber, these residues being almost exclusively in the cis-1,4-addition configuration, i.e., in units having the structural formula

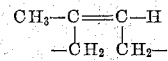

disposed along the polymer chain. Conventional synthetic diene polymers contain the diene residues in a variety of other configurations, the cis-1,4-addition mode usually constituting less than one-third of the entire structure.

It has been discovered, in an investigation in which the present applicant has been associated, that carefully purified isoprene, when polymerized by the action of metallic lithium, or other lithium-dependent catalyst, yields polyisoprenes having, in a large measure, the fundamental cis-1,4-addition structure of Hevea rubber. In general, these polymers will contain from 70% to 90% or more of the cis-1,4-addition structure. This structural similarity is reflected in a close approach of the properties of these synthetic isoprenes to the properties of Hevea rubber. They are characterized by the excellent tack and building properties of Hevea rubber; and vulcanizates produced thereform have tensile strength (even in non-reinforced stocks), elongation at break, and cool-running properties very nearly equalling those of Hevea rubber vulcanizates. However, these synthetic polyisoprenes do fall slightly short of the properties of Hevea natural rubber, apparently because they still contain several percent of structures other than those resulting from cis-1,4-addition. It would therefore be highly advantageous to reduce this residual undesirable structure.

Accordingly, it is an object of this invention to provide a novel and advantageous method for the polymerization of conjugated diolefins.

Another object is to provide such a process which will result in the production of polymers having superior physical and chemical properties.

A further object is to provide such a process which will produce polymers having fundamental chemical structure and technical properties more closely approaching those of Hevea rubber than has heretofore been possible.

A still further object is to reduce the residual undesirable structure in the lithium-catalyzed polymers above referred to.

Still another and very specific object is to produce a synthetic polymer of isoprene having fundamental structure and properties closely approaching those of Hevea rubber.

SYNOPSIS OF THE INVENTION

The above and other objects are secured, in accordance with this invention, in a process in which a conjugated diolefin or a mixture thereof with other unsaturated compounds copolymerizable therewith is contacted with a composite catalyst comprising (A) lithium metal or other lithium-dependent catalyst in intimate association with (B) an alkali or alkaline earth metal fluoride, fluoborate or fluosilicate. The conjugated diolefin is thereby caused to polymerize and, other factors being equal, the resultant polymer approaches much more closely to the ideal Hevea-rubber-type properties and chemical structure than is obtained with the generality of lithium-dependent catalysts under comparable conditions. Particularly when the diolefin used is isoprene, the resultant polymer approaches very closely to Hevea rubber in these respects. These fundamental chemical and physical similarities of the polyisoprenes produced in accordance with this invention to Hevea rubber are reflected in technically useful behavior and properties of the polydiolefins; they have the excellent tack and working strength of Hevea rubber, and yield vulcanizates having the excellent tensile strength, elongation at break and low internal friction properties of Hevea rubber.

THE DIOLEFINS EMPLOYED

Diolefins suitable for use in this invention include (the preferred) isoprene, butadiene, 2-methyl-1,3-pentadiene, piperylene, 2-t-butyl butadiene, 2-ethyl butadiene, 2-isopropyl butadiene, 2-isobutyl butadiene, and other conjugated diolefins containing up to ten carbon atoms. It will be understood that mixtures of diolefins indicated as being satisfactory may also be used.

The diolefins employed in this invention should preferably be of a high degree of purity for use in the practice of this invention. By high purity is meant that the diolefin should be of at least more than 90 mol percent purity and preferably in the neighborhood of 95 or more mol percent purity. It will be understood that inert hydrocarbons such as the solvents used in the polymerization or non-reactive olefins are not to be considered as impurities in calculating the degree of purity of the diolefin. Reactive hydrocarbon impurities such as acetylenic compounds containing hydrogen on a triply-bonded carbon atom are acidic in character and react directly to destroy the catalyst with production of acetylides; these compounds should be kept to a minimum, or removed. Other unsaturated compounds, such as acetylenic compounds containing no hydrogens on the double bonds, and non-conjugated olefins do not so actively harm the reaction; but they do use up a certain amount of catalyst and some of them tend to polymerize or copolymerize and to that extent spoil the microstructure of the polymer and/or reduce the molecular weight thereof. It is therefore highly recommended that these compounds be removed as far as possible. In general, the purer the conjugated diolefin, the faster the reaction rate and the closer the structure and properties of the resulting polymer to natural rubber. Any inhibitor normally present in a commercial diolefin must be removed by conventional techniques prior to polymerization in accordance with the invention.

Excellent polymers in accordance with the invention are produced from Pure Grade [1] or Research Grade [2] isoprene. The only purification required of these monomers prior to use is removal of inhibitor therefrom. Desirable polymers in accordance with the invention are also produced from a less pure grade of isoprene [3] which has a purity of about 91–93% and contains minor amounts of alkyl acetylenes and various other unsaturates, provided the acetylenic compounds are reduced by well-known chemical and fractionating methods to produce a monomer having a purity of 95% and an index of refraction at 20° C. in the range of about $n_D^{20}=1.4210$ to 1.4216. A final refinement which has been found particularly suitable consists in refluxing the isoprene with sodium or other alkali metal sand, and then distilling the isoprene away from the sand. In the examples below, isoprene of the above standard of purity was used.

*Concentration of moisture, air, oxygen, etc.*

Moisture in the polymerization zone, since it tends to use up catalyst, should be kept at a minimum. Oxygen and other components of the atmosphere have been found to inhibit polymerization and consequently should as nearly as possible be kept out of the reaction zone. To this end it is desirable that the diolefins be handled at all times in contact only with their own vapors or with atmospheres containing only their own vapors and inert gases such as helium or argon. The undesired gaseous materials are conveniently removed by bringing the polymerization charge to a boil and venting a portion (e.g. about 10%) of the charge prior to sealing the same and effecting polymerization. Particularly to be avoided is the presence of oxygenated and nitrogenous organic compounds such as ethers, esters, amines and the like, which are sometimes considered to be indispensable constituents of alkali-metal-based catalyst systems; these compounds should be rigorously excluded from the reaction mixtures of this invention. It will be understood that all of the components entering the reaction chamber—monomeric isoprene, catalyst, solvents, equipment components, etc.—should be free from the deleterious materials discussed in the present paragraph and in the preceding section entitled "The Diolefins Employed" so as not to render useless the precautions for purity recommended.

*Temperature*

It has been found that the molecular weight and proportion of cis-1,4-structure of the polymers in accordance with the invention generally increase as the temperature of polymerization is decreased. Additionally, the reaction is quite difficult to control at elevated temperatures, particularly where diolefins of the preferred highest purity are employed. It has been found that the gel content of the polymer increases as the polymerization temperature increases especially when lithium-dependent catalysts are employed. Consequently, it is desirable to operate at the lowest temperature at which a practical yield of the desired product can be obtained. Since polymerization reactions of the type contemplated frequently require a considerable induction period, it is often desirable to initiate the polymerization reaction at a higher temperature, i.e., at a temperature in excess of 30° C., and then lower the temperature to the desired level by suitable cooling means once the polymerization reaction has been initiated. In this manner, the induction period is lessened and the benefits of low temperature polymerization, as above indicated, are obtained. In general, the polymerization reactions of the invention are carried out at temperatures between —100° C. and 150° C. A polymerization temperature of from 40° C. to 80° C. is preferred.

SOLVENT SYSTEMS

The process of this invention may be carried out as a mass polymerization, in which the monomeric materials are contacted with the catalyst in substantially undiluted state, or may be carried out as a solution polymerization in which the reactants are dissolved and/or dispersed in a suitable inert solvent. Any solvent to be used in the process of this invention must be a non-polar, non-acidic organic solvent. Suitable solvents include the saturated aliphatic hydrocarbon solvents such as straight and branched-chain paraffins and cyclo-paraffins containing from 3 to 16 carbon atoms, such as propane, pentane, hexane, heptane, dodecane, petroleum ether, cyclopentane, cyclohexane, methyl cyclohexane and the like. Aromatic solvents such as benzene, toluene, the several xylenes and the like are also operable. The same considerations as to purity and absence of interfering compounds apply to the solvent as to the monomeric diolefin. A treatment which has been found particularly advantageous for the purification of paraffin solvents such as petroleum ether consists in agitating them with concentrated sulfuric acid, and thereafter repeatedly washing them with water. The solvents may then be dehydrated by passage through a silica gel, alumina, calcium chloride or other dehydrating and adsorbing agent, and thereafter distilling. Similarly as in the case of the isoprene or other diolefin, the solvent after purification should be handled in contact only with its own vapor or with atmospheres containing only its vapor and inert gases such as helium or argon.

COMONOMERS

As noted above, in addition to being polymerized alone, the diolefins may also be copolymerized with other unsaturated compounds. In general, it is preferred that the copolymerized compounnds should constitute not over 25%, based on the total weight of the diolefin plus the copolymerized compounds should constitute not over closest to the properties of Hevea rubber. Hovever, in any copolymers produced by the process of this invention and containing a significant amount, say 10% or more, of a diolefin, the diolefin-derived portion of the polymer chain will possess a microstructure comparable to that of Hevea rubber, and will exhibit properties distinguishing it from comparable conventionally produced polymers. Compounds suitable for copolymerization with diolefins in the practice of this invention include polymerizable ethylenically unsaturated compounds such as styrene, alpha-methyl styrene, and the like. The comonomers should be free of ether, nitrile, nitro and other highly negative groups. It will be understood, of course, that the same rigid standards for purity should be maintained for the comonomers as for the diolefin and solvent.

THE LITHIUM-DEPENDENT CATALYST (A)

By "lithium-dependent catalyst," as used herein, is meant metallic lithium, organolithium compounds, and other lithium compounds in which the lithium is in unoxidized convalent state and is capable of exerting a reducing action. "Organolithium compounds," as used herein, include the various lithium hydrocarbons containing say from 1 to 40 carbon atoms. Suitable lithium hydrocarbons are for instance alkyl lithium compounds such as methyl lithium, ethyl lithium, butyl lithium, amyl lithium, hexyl lithium, 2-ethylhexyl lithium and n-hexadecyl lithium. In addition to the saturated aliphatic lithium compounds, unsaturated compounds are also suitable such as allyl lithium, methallyl lithium and the like. Aryl, alkaryl and aralkyl lithium compounds such as

---

[1] Supplied by Phillips Petroleum Company, Bartlesville, Oklahoma, and represented as having a purity of 99 mol percent and a refractive index at 20° C. of $n_D^{20}=1.422$.
[2] Supplied by Phillips Petroleum Company and represented as having a purity of 99.6 mol percent and a refractive index at 20° C. of $n_D^{20}=1.422$.
[3] Supplied by Enjay Company, Inc.

phenyl lithium, the several tolyl and xylyl lithiums, alpha- and beta-naphthyl lithium and the like are also suitable. Mixtures of the various hydrocarbon lithium compounds are also suitable. For instance, a catalyst can be prepared by reacting an initial hydrocarbon lithium compound successively with an alcohol and with an olefin such as isopropylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, tetramethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, the compound of the formula

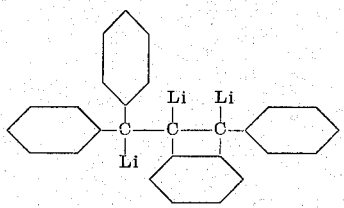

and the like. Tri- and higher lithium hydrocarbons are also suitable, such as 1,3,5-trilithium pentane or 1,3,5-trilithium benzene. Other organolithium compounds include the various lithium hydrocarbon amides. Other strongly reducing lithium compounds which may be used include for instance lithium hydride, lithium phosphide, lithium nitride and the various arylide adducts of lithium with poly-nuclear aromatic hydrocarbons, such as lithium naphthalenide, anthracenide, biphenylide and the like. It should be understood that metallic lithium or the various organolithium compounds illustrated are suitable for producing the polymers of the invention either when utilized alone or when utilized conjointly.

In case metallic lithium is to be the catalyst, the metal is melted, immersed in for example petroleum jelly, and the molten mass is subjected, while maintaining same above the melting point of lithium, to high speed agitation under an inert atmosphere to produce finely divided metallic lithium dispersed in the petroleum jelly. The function of the petroleum jelly is to prevent air from contacting the lithium metal; any other medium which will perform this function is also suitable, such as other inert hydrocarbon solvents which boil above 200° C. e.g., mineral oil, paraffin and the like. With suitable shearing forces, lithium metal can be dispersed in mineral oil or lower boiling aliphatic and aromatic hydrocarbon liquids. It should be understood that high speed agitation is not the only means of providing metallic lithium in a finely divided state; any other means of producing lithium in relatively finely divided state is suitable. The preparation of the metallic lithium catalyst should be carried out in a closed container of non-reactive material, such as stainless steel or the like. Suitably, a high speed stirrer provides the agitation. Excellent results have been obtained with metallic lithium catalyst dispersions produced as above, wherein the particles of lithium had a mean diameter of about 20 or a surface area of about one square meter per gram.

Organolithium compounds, suitable as catalysts in the practice of the invention, are produced in any desired manner. A convenient preparation of hydrocarbon lithiums involves reaction of metallic lithium with a hydrocarbon halide. Unlike the hydrocarbon-metal compounds of the alkali metals other than lithium, the catalytic action of the hydrocarbon lithium catalyst employed in this invention does not appear to be affected by the presence of other alkali metal salt compounds. For instance, in the synthesis of hydrocarbon alkali metal compounds, alkali metal halides are produced as by-products. Similarly, in the catalyst produced by the Alfin technique above referred to, alkali metal alkoxides are present. In the catalysts of polymerization with hydrocarbon-metal derivatives of metals other than lithium, these extraneous salts exert considerable, and in many cases, essential effects. In the practice of the present invention, it does not appear that these extraneous salts have any effect whatsoever; they may be left in the hydrocarbon lithium catalyst, or allowed to settle out, without noticeably changing the action of the catalyst. In the event that one desires to use a hydrocarbon lithium amide as a catalyst, one can easily produce such a compound by reacting a hydrocarbon lithium with a secondary amine to produce the corresponding amide.

THE CONCENTRATION OF CATALYST

As to the amount of catalyst to be used, in general when the reaction is conducted with the conjugated diolefin in the liquid phase, i.e., in liquified pure form or dissolved in liquid solvents, the larger the amount of catalyst used, the more rapidly the polymerization will proceed. Countervailing this desirable effect, high concentrations of catalysts tend to lower the molecular weight of the polymers and also spoil the microstructure of the polymeric chains. Based on these considerations, the amount of catalyst employed should be such as to contain not more than 0.1 gram, and preferably not more than 0.02 gram, of lithium combined in the compound, expressed as metallic lithium, per 100 grams of conjugated diolefin in the polymerization mixture when lithium hydrocarbons or other lithium compounds are used as the catalyst components. Metallic lithium, since it forms a separate phase, need not be controlled as to concentration. There appears to be no theoretical lower limit to the amount of catalyst used; at low concentrations, the catalysts appear to have a high order of efficiency, i.e., if the reaction environ ment is scrupulously purged of all contaminants such as oxygen, ozone, water, carbon dioxide, etc., which would react with and consume the catalyst, the catalyst appears to be used principally in the production of polymer chains so that, as long as any catalyst is present, some degree of polymerization will take place. For economic reasons of obtaining a rapid reaction rate and optimum reactor utilization, it is preferred to have at least 0.00002 gram of free or covalent lithium present per 100 grams of conjugated diolefin. The above concentrations are, of course, expressed on the basis of catalyst effectively present in the polymerization mass; if substances which will react with and destroy the catalyst are permitted to enter the reaction zone, the amount of catalyst so destroyed must be subtracted from that supplied in applying the above criteria.

For the purpose of establishing the effective concentration of carbon-linked lithium in any catalyst preparation employed in the practice of this invention, the differential titration technique of Gilman and Haubein, J. Am. Chem. Soc. 66; 1515 (1944) has been found the most suitable procedure, and the concentrations referred to hereinabove and in the claims are to be applied on the basis of analyses made by this method, if any question arises on this point. For most practical purposes, where side reactions are not suspected, simple titration with acid will give reasonably accurate results.

When the polymerization is conducted in the vapor phase, overt concentration considerations are without significance, and the conjugated diolefin and catalyst may be supplied in any ratios whatsoever.

THE ALKALI AND ALKALINE EARTH METAL FLUORIDES, FLUOBORATES AND FLUOSILICATES (B)

These may be any of the fluorides, fluoborates or fluosilicates of the alkali or alkaline earth metals, examples of such compounds being lithium fluoride, sodium fluoride, potassium fluoride, cesium fluoride, magnesium fluoride calcium fluoride, strontium fluoride, barium fluoride, lithium fluoborate, sodium fluoborate, potassium fluoborate, calcium fluoborate, magnesium fluoborate, lithium fluosilicate, sodium fluosilicate, potassium fluosilicate, magnesium fluosilicate, calcium fluosilicate and the like.

THE COMBINATION OF LITHIUM-DEPENDENT CATALYST (A) PLUS THE ALKALI AND ALKALINE EARTH METAL FLUORIDES, FLUOBORATES AND FLUOSILICATES (B)

The composite catalysts of this invention are prepared by intimately mixing together the lithium-dependent catalyst and the alkali and alkaline earth metal compounds (B). Preferably, the mixture is thoroughly agitated together for an extended period before contacting with the materials to be polymerized, as the advantageous catalytic effect appears to be due to some sort of interaction between the two components. Most conveniently the mixing is done in the presence of an inert solvent such as is disclosed hereinbelow as suitable for conducting the polymerization reaction. Some kind of reaction, of obscure nature, appears to take place between the lithium-dependent catalyst and the alkali and alkaline earth metal compounds; suspensions of the composite catalyst assume a swirling, nacreous appearance, and, where lithium metal is employed as one component of the catalyst, the lithium metal can no longer be seen floating independently on the surface of the suspension medium. In order to effect the association of the lithium catalyst and the alkali and alkaline earth metal fluorides, it is preferred (although not absolutely necessary, since a considerable degree of association will be brought about by the agitation involved in mixing) to agitate or grind the components together for a substantial time, say one hour or more. Conveniently, the agitation may be carried out with the materials suspended or slurried in a suitable inert organic solvent. The ratio of lithium-dependent catalyst to alkali and alkaline earth metal fluorides does not appear to be critical; commercially, this ratio may vary from 1:20 to 20:1 on a molar basis. The agitating together may take place at any convenient temperature, usually room temperature; however, elevated temperatures, with application of pressure if needed to confine the reactants, may also be applied.

POLYMERIZATION AND POLYMER RECOVERY OPERATIONS

For small scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the conjugated diolefin and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the conjugated diolefin to evaporate with the bottle loosely capped. The catalyst, which will usually be in the form of a readily flowable suspension of the catalyst, is usually introduced last, just before sealing the crown cap. A hypodermic syringe is a convenient instrument for the handling of the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from any solvent used in the polymerization mass. The separated polymer is then preferably washed with water on a roll mill, usually with addition of further stabilizing agents, and dried.

Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the conjugated diolefin and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature, which will usually be maintained between 0° and 150° C., preferably between 30° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorporate the antioxidant. The precipitated mass may be milled with water on a wash mill to remove the alcohol, additional antioxidant being incorporated during this operation. The product is then dried for storage and use.

THE INFRA-RED DATA

The data given hereinbelow as to the proportions of cis-1,4-; trans-1,4-; 1,2- and 3,4-additions in the products of this invention were determined by infra-red analysis. The relative amounts of the four structures named are found by means of measuring the intensities of the infra-red absorption bands at 8.85, 8.68, 10.98 and 11.25 microns for the four types of structures in the order given, and inserting these values into the equation:

$$D^i = e_1^i C_1 + e_2^i C_2 + e_3^i C_3 + e_4^i C_4$$

where $D^i$ = absorbance (optical density) of the polymer at wavelength $i$ $e_{1,2,3 \text{ or } 4}^i$ = the absorptivities of the several structures at wavelength $i$, the subscripts 1,2,3 and 4 referring to the several component structures, and $C_{1,2,3 \text{ or } 4}$ = the concentrations of the several structures, the subscripts 1, 2, 3 and 4 referring to the several component structures.

The four equations obtained in this way are solved for $C_1$, $C_2$, $C_3$ and $C_4$, the values of the concentrations of the cis-1,4-; trans-1,4-; 1,2-addition and 3,4-addition components of the polymer.

The peak wavelengths selected, and the valves of the absorptivities $e^1$ for these wavelengths for the several structures, are tabulated herewith:

|  | Molar Absorptivities $e^1$ at Wavelength of— | | | |
|---|---|---|---|---|
|  | 8.68 microns | 8.85 microns | 10.98 microns | 11.25 microns |
| 1,2-Addition | 3.531 | 3.531 | 149.0 | 10.199 |
| 3,4-Addition | 1.541 | 1.815 | 7.363 | 145.0 |
| Cis-1,4-Addition | 3.583 | 6.518 | 1.860 | 1.530 |
| Trans-1,4-Addition | 5.927 | 1.934 | 2.277 | 1.885 |

Percentage values for the various types of addition structures, base on the total polymer, are derived by dividing the absolute concentration of each type of component by the sum of the concentrations of the four types of components (1,2-; 3,4-; cis-; and trans-) determined and multiplying by 100%, so that the sum of the percentages given will always be 100%. In order to assess the accuracy of the determination, total unsaturation is found; this is the quotient of the sum of the concentrations of the various components found by infra-red analysis, divided by the concentration of the solution used in the analysis which is found by determining the total solids.

With the foregoing general description in mind, there are given herewith detailed examples of the practice of this invention. All parts given are by weight.

EXAMPLE I

|  | Grams |
|---|---|
| Isoprene | 25 |
| Petroleum ether | 50 |
| Sodium fluoborate | 1.1 |
| Lithium dispersion (dispersion in petrolatum contains 35% lithium) | .068 |

The above ingredients were charged into an 8-ounce beverage bottle which had previously been baked and flushed with helium, and which contained a magnetic stirring bar. A small amount of the isoprene was permitted to evaporate to purge the free space in the bottle, which was then sealed and placed on a magnetic stirrer in an ambient atmosphere of 25° C. At the end of 18 hours, the bottle was cut open and the polymer precipitated by stirring the solution into isopropanol containing an antioxidant. The polymer was removed from the isopropanol, and washed on a wash mill with water. Infra-red examination indicated that the product contained 89.9% cis-1,4-; 2.5% trans-1,4-; and 7.6% 3,4-unsaturation, the total unsaturation found being 86.0%. Similar results are obtained by replacing the sodium fluoborate with sodium and potassium fluosilicates.

EXAMPLE II

|  | Parts |
|---|---|
| Isoprene | 100 |
| Petroleum ether | 300 |
| Sodium fluoborate | 1.1 |
| Lithium dispersion (dispersion in petrolatum contains 35% lithium) | 0.06 |

The sodium fluoborate, lithium dispersion and petroleum ether were charged into a tumbling reactor which had previously been purged with helium. The ingredients were then tumbled at 25° C. for 24 hours, at the end of which time the lithium appeared to have been entirely taken up as a complex with the sodium fluoborate, since no lithium could be observed floating upon the liquid, and the liquid itself exhibited nacreous streaming lines when agitated. The isoprene was then pressured in, the temperature adjusted to 50° C., and tumbling continued for an additional 18 hours. At the end of this time, the reaction mixture was discharged from the vessel and the polymer precipitated therefrom by stirring with isopropanol containing 2% of an antioxidant. The polymer was washed with water on a wash mill, and dried in a vacuum oven. The polymer had an intrinsic viscosity of 12.0, with a gel content of 5.5%, and infra-red examination indicated that the polymer contained 94.4% cis-1,4-; 0.0% trans-1,4; 0.0%, 1,2-; and 5,6% 3,4-unsaturation; the total unsaturation found being 93.5%.

The polymer prepared as just described was compounded in accordance with a conventional tire tread formulation, extruded as a tread and built into a tire of otherwise conventional components. The tire was cured in a conventional cycle, and gave excellent service on the road.

EXAMPLE III

|  | Parts |
|---|---|
| Isoprene | 50 |
| Petroleum ether | 52 |
| Lithium dispersion (35% paste in petrolatum) | 0.56 |
| Sodium fluoborate | 1.1 |

The lithium dispersion, sodium fluoborate and 100 parts of the petroleum ether were charged into a reactor which had previously been purged with helium. The mixture was agitated for 18 hours. Thereafter the isoprene and the remainder of the petroleum ether were charged, and agitation continued for an additional 24-hour period at 30° C. At the end of this period, the reaction mass was discharged under the surface of an agitated body of hot water, so as to flash off the petroleum ether, leaving the polymer as a crumb. The polymer was then washed on a wash mill, antioxidant being added to the polymer on the mill during the washing. The polymer had an intrinsic viscosity of 14.1 and a gel content of 1%. Infra-red analysis showed 92.7% cis-1,4-; 0.0% trans-; 0.0% 1,2-; and 7.3% 3,4-unsaturation, the total unsaturation found being 91.5%. Polymers having correspondingly enhanced cis-1,4-structure are obtained by replacing the isoprene in the above recipe with butadiene, 2,3-dimethylbutadiene, and piperylene.

EXAMPLE IV

|  | Grams |
|---|---|
| Isoprene | 50 |
| Petroleum ether | 52.5 |
| Calcium fluoride | 0.78 |
| Lithium paste (35% dispersion in petrolatum) | 0.37 |

The calcium fluoride, lithium paste and 100 grams of the petroleum ether were charged and sealed into a 6-ounce beverage bottle which had previously been flamed and which was flushed with helium before and during the charging. The bottle contained a magnetic stirring bar and was placed on a magnetic stirrer for 18 hours. The bottle was then opened, the isoprene and balance of the petroleum ether charged while flushing with helium, and the bottle resealed. Magnetic stirring was resumed and continued for a further 24 hours. The bottle was then cut open and the contents stirred into a body of isopropanol, containing an antioxidant, to precipitate the polymer. The polymer was washed with water on a wash mill and dried in a vacuum oven. The product had an intrinsic viscosity of 12.3 and contained 0.5% gel. Infra-red analysis showed 92.0% cis-1,4-; 0.0% 1,2-; 7.9% 3,4-; and 0.0% trans-1,4- unsaturation, 90.2% being the total unsaturation found.

This application is a continuation-in-part of my copending application Serial No. 582,071 filed May 2, 1956, now abandoned.

What is claimed is:

Process which comprises contacting isoprene with a composite catalyst comprising a complex of lithium metal in association with sodium fluoborate, the amount of catalyst employed being sufficient to contain not more than 0.1 gram of metallic lithium per 100 grams of isoprene.

References Cited by the Examiner

UNITED STATES PATENTS

| | | | |
|---|---|---|---|
| 2,881,156 | 4/1959 | Pilar et al. | 260—94.3 |
| 2,947,737 | 8/1960 | Stearns | 260—94.2 |

JOSEPH L. SCHOFER, *Primary Examiner.*

MORRIS LIEBMAN, *Examiner.*

E. L. ROBERTS, L. EDELMAN, *Assistant Examiners.*